United States Patent

[11] 3,611,198

[72] Inventor John Y. Ma
Glenview, Ill.

[21] Appl. No. 34,035
[22] Filed May 4, 1970
[45] Patented Oct. 5, 1971
[73] Assignee Zenith Radio Corporation
Chicago, Ill.

[54] FREQUENCY-SELECTIVE COUPLING CIRCUIT FOR ALL-CHANNEL TELEVISION ANTENNA HAVING UHF/VHF CROSSOVER NETWORK WITHIN UHF TUNER
8 Claims, 2 Drawing Figs.

[52] U.S. Cl. .......... 333/6, 325/379, 325/462, 334/1
[51] Int. Cl. .......... H03h 7/46
[50] Field of Search .......... 333/6, 8; 325/458–463, 379; 334/1–3, 85, 89; 343/858; 178/5.4 RC

[56] References Cited
UNITED STATES PATENTS
2,817,064 12/1957 Carlson .......... 334/3 X

*Primary Examiner*—Herman Karl Saalbach
*Assistant Examiner*—Paul L. Gensler
*Attorney*—James E. Tracy

ABSTRACT: UHF and VHF television signals, picked up by a common all-channel antenna, are separated by high- and low-pass filters of a crossover network for application to tunable frequency selector input circuits of UHF and VHF tuners. By placing the crossover network within the UHF tuner irregularities or discontinuities are minimized in the transmission line from the antenna to the UHF tuner's input circuit and the length of the transmission line from the high-pass filter to the UHF tuner's input circuit is made substantially zero. This results in maximum signal transmission of the UHF television signals to the UHF tuner and of the VHF television signals to the VHF tuner.

PATENTED OCT 5 1971 3,611,198

Inventor
John Y. Ma
By James E. Tracy
Attorney

FREQUENCY-SELECTIVE COUPLING CIRCUIT FOR ALL-CHANNEL TELEVISION ANTENNA HAVING UHF/VHF CROSSOVER NETWORK WITHIN UHF TUNER

BACKGROUND OF THE INVENTION

This invention pertains to a novel frequency-selective signal-translating system for use in a television receiver for coupling a single all-channel antenna to tunable input circuits of UHF (ultra high frequency) and VHF (very high frequency) tuners in order that only television signals conveyed over UHF channels are supplied to the UHF tuner while only television signals carried over VHF channels will be translated to the VHF tuner. More particularly the invention relates to an arrangement for maximizing the signal transmission, and minimizing the insertion loss, between the antenna and the inputs of the tuners.

In accordance with the transmission standards existing in the U.S., five of the 12 VHF channels fall within the low VHF band (54 to 88 MHz.), the other seven VHF channels occupy the high VHF band (174 to 216 MHz.), and the 70 UHF channels lie in the UHF band which extends from 470 to 890 MHz. For economy the employment of only one television antenna, capable of receiving all 82 channels, is preferred over using two separate antennas for UHF and VHF reception respectively. Unfortunately, there are attendant shortcomings and disadvantages in the use of an all-channel antenna. It has not been possible heretofore to obtain the same signal transmission characteristics with an all-channel antenna-coupling system as that realized with separate UHF and VHF antennas having separate antenna-coupling circuits.

The problems that have plagued previous coupling systems for all-channel antennas may most easily be appreciated by referring to the schematic diagram of FIG. 1 which illustrates a widely used prior art arrangement for coupling an all-channel antenna to the inputs of UHF and VHF tuners. In FIG. 1, the UHF/VHF antenna 10 is coupled via 300-ohm-twin lead balanced transmission line 11 to the input of balun 12 which includes an impedance-matching transformer for properly matching the 300 ohm balanced transmission line to 75 ohm unbalanced coaxial cable transmission line 15 whose output or load end is coupled to the input of UHF/VHF crossover or diplexer network 17. Series-connected capacitor 18 and shunt-connected inductor 19 in network 17 form a conventional high-pass filter so that television signals of the UHF band may be segregated from those of the VHF bands for delivery along 75 ohm coaxial cable transmission line 22 to the input circuit of UHF tuner 24.

Customarily, tuner 24 is of the continuously tunable, superheterodyne type and is contained within a grounded metal housing divided into at least three separate compartments or chambers each of which includes and forms part of a tunable frequency selector or resonant circuit having a fixed inductor and a shunt-connected variable-capacitance device as is schematically illustrated by elements 26 and 27 within compartment 29, usually called the preselector compartment as it is tuned to the midfrequency of the desired UHF channel and constitutes the input circuit of the tuner. The output end of cable 22 is coupled to the tuner's input circuit by means of inductor 31. Capacitance device 27 usually takes the form of either a variable air capacitor or a voltage-controlled variable-capacitance diode, commonly called a varactor or Varicap diode.

A low-pass filter comprising series-connected inductor 33 and shunt-connected capacitor 34 connects to circuit junction 35 and segregates the VHF television signals, picked up by antenna 10, for application over 75 ohm coaxial cable transmission line 36 to the tunable frequency selector input circuit of VHF tuner 38 which is contained within its own grounded metal housing. The tunable input circuit is schematically shown by variable-inductance coil 39 and fixed capacitor 41. In a VHF tuner of the nonvaractor type different inductance coils are ordinarily either switched into, or added in increments to, the tunable circuits to effect tuning to each of the VHF channels. In a varactor-type VHF tuner it is the capacitance portion of each tunable circuit that is made adjustable.

The prior art arrangement of FIG. 1 suffers from at least two major problems, both of which prevent the attaining of maximum signal transmission of the 70 UHF channels to tuner 24 and of the 12 VHF channels to tuner 38. The mere presence of network 17 in the transmission line from the output of balun 12 to the input of UHF tuner 24 makes it impossible to transfer all of the received UHF signal energy to the tuner, and this is true even though cable 22 may be terminated by the line's characteristic impedance, namely 75 ohms. To explain, crossover network 17 introduces an irregularity or interruption which gives rise to undesired resonances and unbalance conditions creating reflected waves. In order for all of the signal energy to be absorbed by the load (namely the UHF tuner's input circuit), there must not be any reflected waves. There must be a voltage-standing wave ratio of unity. Network 17 thus causes an insertion loss or power dissipation, as a consequence of which the television signals translated to tuner 24 experience an appreciable attenuation.

Secondly, cable 22 is likely to trap or filter out the television signals of at least one of the VHF channels, thus either preventing them entirely from reaching the VHF tuner's input or resulting in the application to the tuner of substantially attenuated or suppressed television signals. Due to the carrier frequencies employed for the VHF channels, the length of cable 22 will probably be equal to one-quarter of a wavelength, or an odd multiple of one-quarter of a wavelength, of the carrier frequency for one of the 12 VHF channels. Cable 22 effectively provides a parallel resonant circuit to ground, namely in shunt with coil 19, which resonates at that particular carrier frequency and "robs " the VHF tuner's input circuit of its signal energy. At resonance, capacitor 18 serves as a coupling capacitor and a major portion, if not all, of the television signal energy that should be translated from junction 35 and to the VHF tuner is instead diverted through coupling capacitor 18 and dissipated in cable 22. Hence, it is not possible in the prior art to transmit to tuner 38 all 12 VHF channels without any significant attenuation. One VHF channel will be substantially suppressed, if not eliminated entirely.

The present invention constitutes a significant improvement over the prior art approach of FIG. 1 since applicant's antenna coupling system is capable of feeding, from a common antenna and without any material attenuation, television signals of any of the UHF channels to a UHF tuner and television signals of any of the VHF channels to a VHF tuner.

Accordingly, it is an object of the invention to provide a new and improved frequency-selective coupling circuit for an all-channel antenna in a television receiver.

It is another object to provide, for an all-channel television antenna, a coupling system having substantially greater signal transmission characteristics than attainable heretofore.

A further object is to provide in an antenna-coupling system, and without introducing any insertion loss, a filtering arrangement for separating received UHF and VHF television signals from each other for delivery to appropriate tuners.

SUMMARY OF THE INVENTION

The frequency-selective signal-translating system of the invention is to be incorporated in a television receiver for coupling a single all-channel antenna to tunable frequency selector input circuits of UHF and VHF tuners. In accordance with one aspect of the invention, the signal-translating system comprises a UHF/VHF crossover network, having high- and low-pass filters, located within the UHF tuner. There are means including the high-pass filter for coupling the all-channel antenna to the UHF tuner's input circuit to translate thereto only television signals conveyed over UHF channels. Means, including the low-pass filter, couple the antenna to the VHF tuner's input circuit to deliver thereto only television signals carried over VHF channels.

DESCRIPTION OF THE FIGURE ILLUSTRATING THE INVENTION

The features of the invention which are believed to be novel are set forth with particularity in the appended claims. The invention, together with further objects and advantages thereof, may best be understood, however, by reference to the following description in conjunction with FIG. 2 which is a schematic diagram of the same portion of a television receiver as is shown in FIG. 1 except modified in accordance with one embodiment of the invention. The circuit elements that are common to both FIGS. 1 and 2 are identified by like reference numerals.

DESCRIPTION OF THE ILLUSTRATED EMBODIMENT

Figures 1, 2:
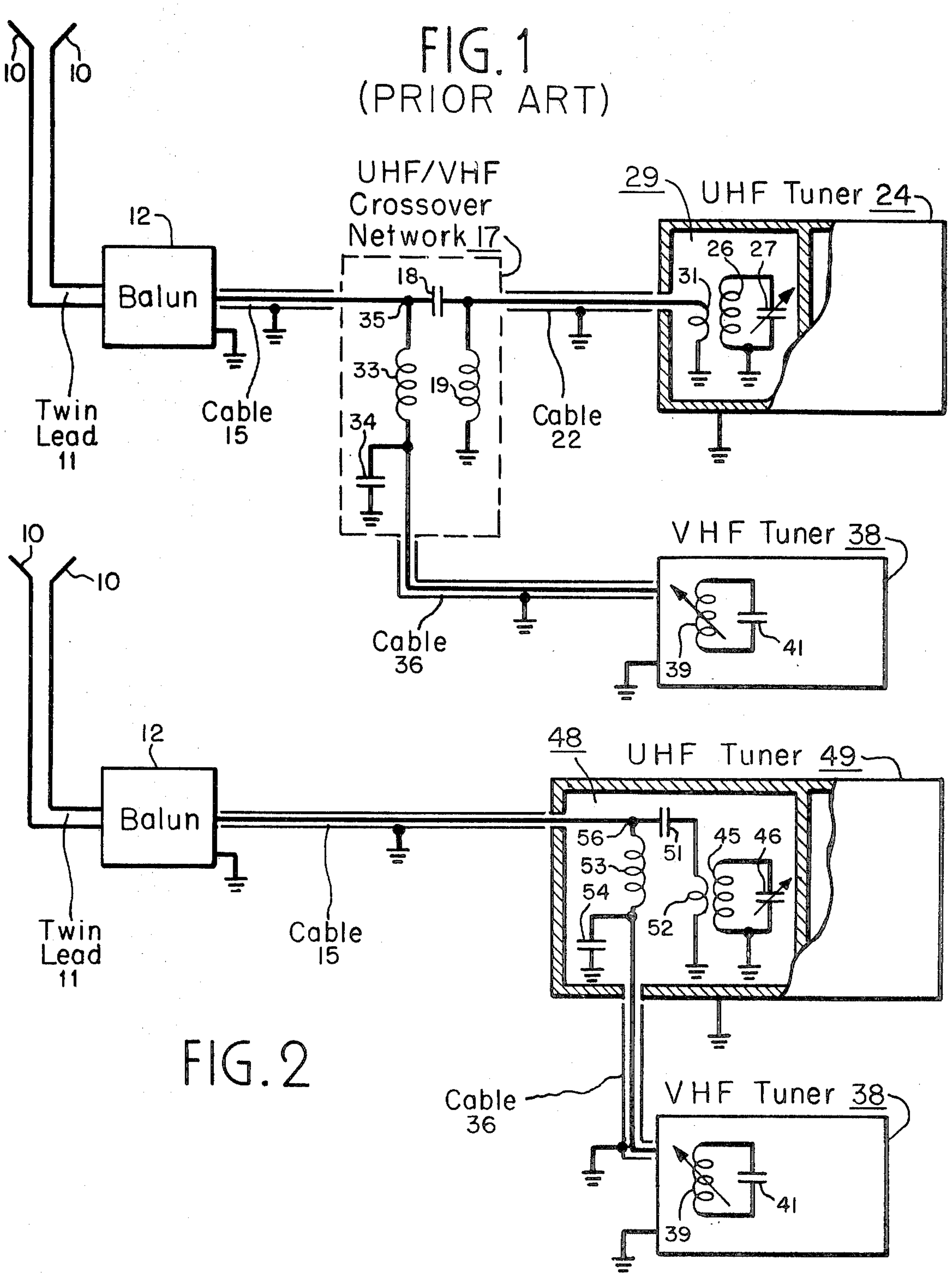
FIG. 1 (PRIOR ART), FIG. 2

In Brief, the antenna-coupling system in FIG. 2 differs from that of FIG. 1 by placing the UHF/VHF crossover network within the preselector compartment of the UHF tuner, thereby eliminating troublesome cable 22 and providing a continuous uninterrupted transmission line from balun 12 to the UHF tuner's input circuit.

More specifically primarily inductor 45, variable-capacitance device 46 and compartment 48 function as the tunable frequency selector input circuit of UHF tuner 49. To a limited extent, the reactive impedances of the crossover network also form part of the tunable input circuit. Capacitor 51 and inductor 52 function as the high-pass filter portion of the crossover network, while inductor 53 and capacitor 54 serve as the low-pass filter section of the network. Note that by inductively coupling inductors 52 and 45, inductor 52 will perform the two functions performed by the separate inductors 19 and 31 in FIG. 1. Hence, among other advantages of the invention, an entire inductor has been eliminated.

High-pass filter 51, 52 separates out from the television signals translated along cable 15 only those television signals having carrier frequencies in the UHF band and by virtue of the inductive coupling between inductors 52 and 45 the UHF television signals will be applied to the UHF tuner's input circuit. Unlike the prior art approach of FIG. 1, however, the absence of any irregularity in the transmission line from balun 12 to tuner 49 maximizes the signal transmission line from balun 12 to tuner 49 maximizes the signal transmission properties of the coupling circuit from antenna 10 to the UHF tuner's input circuit. The circuit parameters may be selected so that the output end of cable 15 is terminated by its characteristic impedance for any channel in the UHF band. With cable 15 unbroken and properly terminated, there will be no reflected waves along cable 15 and the entirety of the signal energy of the UHF channels will reach and be absorbed by the UHF tuner's input circuit. With no power dissipation (and therefore no attenuation) in cable 15 with respect to the UHF television signals, the insertion loss between antenna 10 and UHF tuner 49 will be essentially zero. Such a quality has not been obtainable heretofore in antenna-coupling systems for all-channel television antennas, and this is especially so as to the prior art arrangement of FIG. 1.

Of course, twin lead transmission line 11 and balun 12 do not introduce any significant insertion loss. In this connection, it is to be understood that elements 11 and 12 could be eliminated and the input end of cable 15 could be extended all the way back to antenna 10. Moreover the input end of cable 15, in addition to being connected to balun 12 as shown, could also be connected via another 75 ohm coaxial cable to a jack mounted on the rear panel of the television receiver for use in a CATV system, namely a community antenna television system.

Low-pass filter 53, 54 is designed to segregate from the television signals traveling along cable 15 only those signals having carrier frequencies lying in the two VHF bands for delivery over cable 36 to the tunable frequency selector input circuit 39, 41 of VHF tuner 38. Appropriate circuit parameters are chosen in order that the load end of cable 15 is also terminated by a 75-ohm load with respect to the VHF television signals. As to the carrier frequencies of the VHF television signals, high-pass filter 51, 52 presents a relatively high impedance (specifically a capacitive reactance), as a result of which no VHF signal energy will be diverted from circuit junction 56 and translated through capacitor 51 and inductor 52. Since the transmission line between capacitor 51 and inductor 52 is essentially of zero length, the input of the VHF tuner will never be shunted by a resonating transmission line circuit, and consequently "robbed " of signal energy. This applies to all 12 of the VHF channels. Unlike FIG. 1 a trap circuit, which filters out the television signals of one of the VHF channels, will not exist across the output end of cable 15 in FIG. 2. A parallel resonant circuit to ground will not be coupled via capacitor 51 to junction 56. Thus, high-pass filter 51, 52 and the UHF tuner circuitry to which the filter is coupled can be ignored for all VHF channels. Television signals of all of the VHF channels will be transmitted to tuner 38 with substantially no attenuation.

It is to be appreciated that the invention is susceptible of a variety of different modifications and thus may be employed in many different embodiments. For example, as illustrated, each of tuners 49 and 38 in FIG. 2 is contained within its own metal housing and coaxial cable 36 is connected between the two housings. Of course, the two tuners may be combined in one structure with different portions thereof employed for VHF and UHF tuning respectively. As another example, in the disclosed embodiment balun 12 is separated from tuner 49 and cable 15 is required to connect the two. Obviously, the balun could be mounted on and supported by one of the walls of the housing, in which case cable 15 would be eliminated entirely. Furthermore, the balun could be deleted and the UHF tuner connected to the antenna solely by a 300-ohm-twin lead transmission line. The same type of transmission line would then be employed between tuners 49 and 38 and the input impedances of the tuners would have to be modified so that each of the transmission lines would be terminated by 300 ohms.

The invention provides, therefore, a unique all-channel antenna-coupling system which achieves considerably greater antenna-to-tuner signal transmission than obtainable heretofore.

While a particular embodiment of the invention has been shown and described, modifications may be made, and it is intended in the appended claims to cover all such modifications as may fall within the true spirit and scope of the invention.

I claim:

1. A frequency-selective signal-translating system for use in a television receiver for coupling a single all-channel antenna to tunable frequency selector input circuits of UHF and VHF tuners, said signal-translating system comprising:
   a UHF/VHF crossover network located within said UHF tuner and including high- and low-pass filters;
   means including said high-pass filter for coupling said all-channel antenna to the UHF tuner's input circuit to translate thereto only television signals conveyed over UHF channels;
   and means including said low-pass filter for coupling said antenna to the VHF tuner's input circuit to deliver thereto only television signals carried over VHF channels.

2. A signal-translating system according to claim 1 in which both of said coupling means include a share a common transmission line.

3. A signal-translating system according to claim 1 in which both of said coupling means include and share a common balun and also a common balanced transmission line which is connected between said antenna and said balun.

4. A signal-translating system according to claim 1 wherein said UHF tuner comprises a metal compartment which includes and forms part of that tuner's input circuit, and in which said crossover network is located within said compartment.

5. A signal-translating system according to claim 4 in which both of said coupling means include and share a common coaxial cable transmission line terminated by said crossover network.

6. A signal-translating system according to claim 1 in which said VHF and UHF tuners are separate and spaced apart from each other and each is contained within its own metal housing, said low-pass filter being coupled to the VHF tuner's input circuit via a coaxial cable transmission line connected between the two housings.

7. A signal-translating system according to claim 1 in which an inductor, included in said high-pass filter, also provides an inductive coupling to the UHF tuner's input circuit.

8. A signal-translating system according to claim 1 in which the UHF tuner's input circuit includes an inductor and a variable-capacitance device and in which said high-pass filter includes a series-connected capacitor and a shunt-connected inductor, the two inductors being inductively coupled.